United States Patent
Yamamura et al.

(10) Patent No.: US 9,266,071 B2
(45) Date of Patent: Feb. 23, 2016

(54) HYDROGEN SEPARATION ALLOY AND METHOD FOR PRODUCING SAME

(75) Inventors: Kazuhiro Yamamura, Yasugi (JP); Masahiro Tobise, Tokyo (JP)

(73) Assignee: Hitachi Metals, Ltd., Toyko (JP)

( * ) Notice: Subject to any disclaimer, the term of this patent is extended or adjusted under 35 U.S.C. 154(b) by 539 days.

(21) Appl. No.: 13/389,618

(22) PCT Filed: May 31, 2011

(86) PCT No.: PCT/JP2011/062428
§ 371 (c)(1),
(2), (4) Date: Feb. 9, 2012

(87) PCT Pub. No.: WO2011/152369
PCT Pub. Date: Dec. 8, 2011

(65) Prior Publication Data
US 2012/0138196 A1 Jun. 7, 2012

(30) Foreign Application Priority Data

May 31, 2010 (JP) .................................. 2010-123653

(51) Int. Cl.
| | |
|---|---|
| C22C 27/02 | (2006.01) |
| B01D 71/02 | (2006.01) |
| B01D 67/00 | (2006.01) |
| C22F 1/00 | (2006.01) |
| C22F 1/16 | (2006.01) |
| C22F 1/18 | (2006.01) |
| C01B 3/50 | (2006.01) |

(52) U.S. Cl.
CPC .......... *B01D 71/022* (2013.01); *B01D 67/0074* (2013.01); *C01B 3/503* (2013.01);
(Continued)

(58) Field of Classification Search
CPC .......................... B01D 2323/12; C01B 3/503
USPC .................................................. 148/557, 422
See application file for complete search history.

(56) References Cited

U.S. PATENT DOCUMENTS

| | | | |
|---|---|---|---|
| 7,468,093 B2 * | 12/2008 | Aoki et al. ........................ 95/56 |
| 2005/0217480 A1 | 10/2005 | Aoki et al. | |
| 2010/0092333 A1 | 4/2010 | Yamamura et al. | |

FOREIGN PATENT DOCUMENTS

| | | |
|---|---|---|
| EP | 1992401 A1 * | 11/2008 |
| JP | 2000159503 A * | 6/2000 |

(Continued)

OTHER PUBLICATIONS
NPL: machine translation of JP2000159503A, Jun. 2000.*
(Continued)

*Primary Examiner* — Jie Yang
(74) *Attorney, Agent, or Firm* — Crowell & Moring LLP

(57) ABSTRACT

Disclosed is a hydrogen separation alloy which is adoptable to a product having a large surface area of a side where hydrogen permeates and which has such a metallographic structure as to improve hydrogen permeability and to improve hydrogen-embrittlement resistance. The hydrogen separation alloy used herein is represented by the compositional formula: $Nb_{100-(\alpha+\beta)}M^1_\alpha M^2_\beta$ where $M^1$ is at least one element selected from the group consisting of Ti, Zr and Hf; $M^2$ is at least one element selected from the group consisting of Ni, Co, Cr, Fe, Cu and Zn; $10\le\alpha\le60$, $10\le\beta\le50$, and $\alpha+\beta\le80$. The alloy contains inevitable impurities. And the alloy includes two phases, i.e., an $Nb-M^1$ phase serving as a hydrogen-permeable phase, and a $M^2-M^1$ phase serving as a hydrogen-embrittlement-resistant phase. The hydrogen-permeable phase and the hydrogen-embrittlement-resistant phase have an elongated structure resulting from rolling. The hydrogen-permeable phase occupies 35% to 70% of an arbitrary 10 μm×10 μm region in a 50 μm×50 μm observation plane of a cross section of the alloy under an electron microscopic observation, the cross section is taken in a direction of thickness reduced by the rolling and in a direction of rolling and flattening.

11 Claims, 3 Drawing Sheets

(52) U.S. Cl.
CPC ................ *C01B 3/505* (2013.01); *C22C 27/02* (2013.01); *C22F 1/00* (2013.01); *C22F 1/16* (2013.01); *C22F 1/18* (2013.01); *B01D 2323/12* (2013.01); *B01D 2325/04* (2013.01)

(56) References Cited

FOREIGN PATENT DOCUMENTS

| | | |
|---|---|---|
| JP | 2005-232491 | 9/2005 |
| JP | 2006-274297 | 10/2006 |
| JP | 2006-274298 | 10/2006 |
| JP | 2008-63628 | 3/2008 |
| JP | 2008-229431 | 10/2008 |
| JP | 2010-84232 | 4/2010 |
| WO | WO 2008/111516 A1 | 9/2008 |

OTHER PUBLICATIONS

S. Arakawa et al., Dimensions and Magnetic Properties of Wide and Long Amorphous Ribbons, Proc. $4^{th}$ Int. Conf. on Rapidly Quenched Metals (Sendai, 1981), pp. 89-92.

* cited by examiner

20 μm

20 μm

HYDROGEN SEPARATION ALLOY AND METHOD FOR PRODUCING SAME

TECHNICAL FIELD

The present invention relates to a hydrogen separation alloy to be used for obtaining high-purity hydrogen, and a method for producing the same.

BACKGROUND ART

Fuel cells have recently received attention as clean energy. Hydrogen gas serving as a fuel for the fuel cells is not present in a large amount in nature and should be generated artificially.

As one of processes for the hydrogen generation, there is a process for preparing hydrogen by electrolysis of water. This technique, however, costs too much at current technical levels, and hydrogen production is therefore currently mainly performed by reforming of fossil resources.

This process, however, gives not only hydrogen but also impurity gases such as CO, $CO_2$ and $H_2O$. Among them, CO poisons electrodes of the fuel cells. To avoid this and to adopt hydrogen obtained by reforming of the fossil resources to fuel cells, hydrogen should be separated and purified from such impurity gases to have a higher purity.

A membrane separation technique using a metal membrane is known as a hydrogen purification technique for simply obtaining high-purity hydrogen. Exemplary hydrogen separation metal membranes now practically used include a Pd—Ag alloy membrane. However, it is predicted that the Pd—Ag alloy membrane does not satisfy growing demands made upon wider usage of fuel cells in future, because expensive and rare Pd poses limitations to the use of Pd—Ag alloy membrane. For this reason, there is a demand for developing a novel metal membrane material instead of the Pd—Ag alloy.

As novel metal membrane materials, V, Nb and Ta have high hydrogen permeability even being used alone and receive attention. Hydrogen separation alloys having both high hydrogen permeability and satisfactory hydrogen-embrittlement resistance have been developed by alloying any of these metals with another metal such as Ti, Zr, Hf, Ni or Co to form a multiphase alloy.

Typically, Ni—Ti—Nb multiphase alloys proposed in PTL 1 and PTL 2 each including a phase playing a role in hydrogen permeation and a phase playing a role in resistance to hydrogen embrittlement become a focus of attention.

The multiphase alloys described in PTL 1 and PTL 2 each have a composition including only two phases of a phase having satisfactory hydrogen permeability but becoming brittle and susceptible to fracture upon hydrogen absorption (hereinafter also referred to as a "hydrogen-permeable phase") and a phase having inferior hydrogen permeability but being resistant to fracture even upon absorption of hydrogen (hereinafter also referred to as a "hydrogen-embrittlement-resistant phase"), or a composition to form an eutectic crystal of the two phases.

The present inventors have proposed a hydrogen permeable alloy having an oxygen content of 1000 ppm or less in a cast state as a technique for improving the workability of the aforementioned Ni—Ti—Nb alloy in PTL 3.

Independently, PTL 4 discloses a multiphase hydrogen permeable alloy in which a phase playing a role in hydrogen permeation extends in a hydrogen-permeation direction as a technique for improving the hydrogen permeability coefficient by regulating the metallographic structure of the alloy.

CITATION LIST

Patent Literature

PTL 1: Japanese Patent Laid-Open No. 2006-274297
PTL 2: Japanese Patent Laid-Open No. 2005-232491
PTL 3: International Publication No. WO2008/111516
PTL 4: Japanese Patent Laid-Open No. 2008-063628

SUMMARY OF INVENTION

Technical Problem

In the Ni—Ti—Nb multiphase alloys described in PTL 1 to 3, improvements in hydrogen permeability coefficient have been studied, but effects of the metallographic structures of hydrogen separation alloys on hydrogen-embrittlement resistance which is another important property required of such hydrogen separation alloy have not been studied sufficiently.

The multiphase hydrogen permeable alloy described in PTL 4 has a metallographic structure in which a hydrogen-permeable phase extends in a hydrogen-permeation direction as a result of plastic working such as rolling or pressing. This certainly shows significant effects of improving hydrogen permeability.

However, the multiphase hydrogen permeable alloy described in PTL 4 is unsuitable for being adopted to a large-sized product having a large surface area of a side which hydrogen permeates since the product should be produced, for example, by cutting a multiplicity of pieces from the rolled material and assembling the material pieces in combination if the surface area of the side which hydrogen permeates becomes large in case of using the alloy as a hydrogen permeable membrane, because a surface in a direction perpendicular to the surface having undergone the plastic working is employed as a surface which hydrogen permeates.

In the hydrogen permeable membrane described in PTL 4, the surface having undergone the plastic working cannot be expected to exhibit sufficient hydrogen permeability, if used as a hydrogen-permeating surface.

An object of the present invention is to provide a hydrogen separation alloy which is adaptable to a product having a large surface area of a hydrogen-permeating surface, which does not suffer from reduction in hydrogen permeability, and which has such a metallographic structure as to further improve hydrogen-embrittlement resistance.

Solution to Problem

The present invention provides a hydrogen separation alloy which is represented by a compositional formula: $Nb_{100-(\alpha+\beta)}M^1{}_\alpha M^2{}_\beta$, where $M^1$ is at least one element selected from the group consisting of Ti, Zr and Hf; $M^2$ is at least one element selected from the group consisting of Ni, Co, Cr, Fe, Cu and Zn; and $\alpha$ and $\beta$ satisfy the following conditions: $10 \leq \alpha \leq 60$, $10 \leq \beta \leq 50$, and $\alpha + \beta \leq 80$. The hydrogen separation alloy contains inevitable impurities. The hydrogen separation alloy includes two phases of an $Nb\text{-}M^1$ phase serving as a hydrogen-permeable phase, and a $M^2\text{-}M^1$ phase serving as a hydrogen-embrittlement-resistant phase, and the hydrogen-permeable phase and the hydrogen-embrittlement-resistant phase have an elongated structure resulting from rolling.

Advantageous Effects of Invention

The present invention allows an alloy to have a fine layered structure of an elongated hydrogen-permeable phase, to have improved hydrogen-embrittlement resistance by relaxing stress caused by expansion and shrinkage of its crystal lattice with hydrogen absorption/desorption, and to have improved hydrogen permeability.

As a result, the present invention enables inexpensive production of a hydrogen separation alloy which excels both in hydrogen permeability and in hydrogen-embrittlement resistance and which is adaptable even to a large-sized product having a large surface area of a hydrogen-permeating surface.

DESCRIPTION OF EMBODIMENTS

Figure 1:
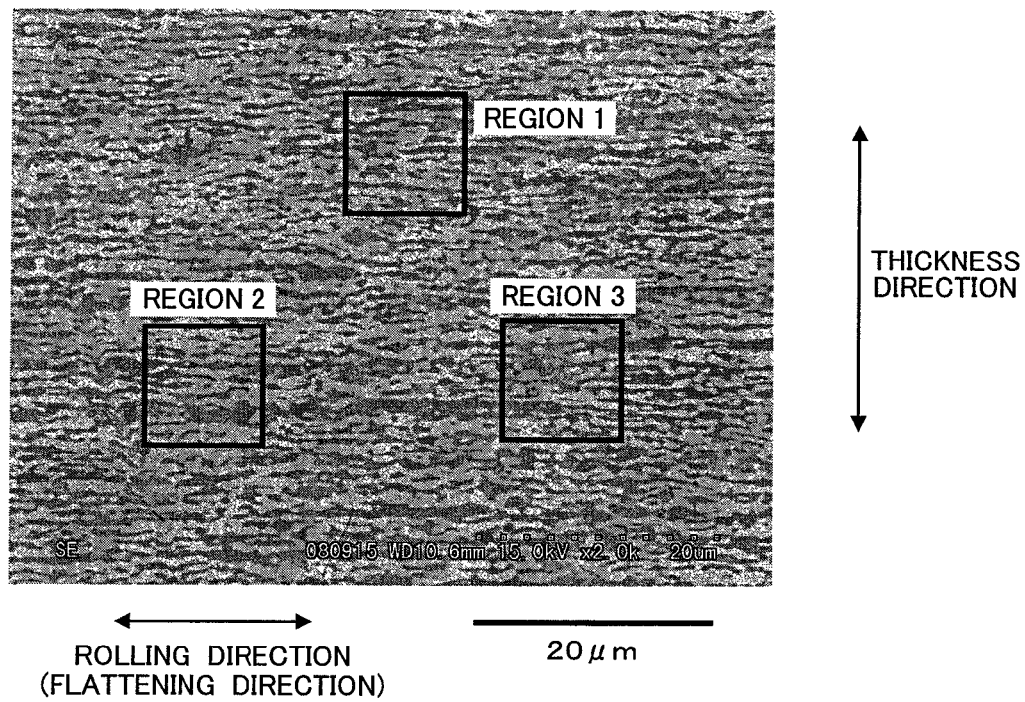
FIG. 1 is an electron micrograph illustrating a cross section of a hydrogen separation alloy according to a working example.

A greatest feature of the present invention is the preparation of a nonconventional noble metallographic structure.

A hydrogen separation alloy and a production method thereof according to one embodiment of the present invention will be illustrated below.

The hydrogen separation alloy has a metallographic structure biphasically separated into an Nb-enriched phase serving as a hydrogen-permeable phase, and a transition metal phase serving as a hydrogen-embrittlement-resistant phase. The hydrogen separation alloy preferably has a composition represented by the compositional formula: $Nb_{100-(\alpha+\beta)}M^1{}_\alpha M^2{}_\beta$ where $M^1$ is at least one element selected from the group consisting of Ti, Zr and Hf; $M^2$ is at least one element selected from the group consisting of Ni, Co, Cr, Fe, Cu and Zn; and $\alpha$ and $\beta$ satisfy following conditions: $10 \leq \alpha \leq 60$, $10 \leq \beta \leq 50$, and $\alpha+\beta \leq 80$. The hydrogen separation alloy contains inevitable impurities. The hydrogen separation alloy includes two phases of an Nb-$M^1$ phase serving as a hydrogen-permeable phase and a $M^2$-$M^1$ phase serving as a hydrogen-embrittlement-resistant phase, and the hydrogen-permeable phase and the hydrogen-embrittlement-resistant phase each have a structure elongated by rolling. The hydrogen-permeable phase occupies 35% to 70% of an arbitrary 10 μm×10 μm square region in a 50 μm×50 μm square observation plane of a cross section of the alloy under observation with an electron microscope, the cross section being taken in a direction of thickness reduced by the rolling and in a direction of rolling and resulting flattening.

The method for producing a hydrogen separation alloy includes a melting step of melting and casting materials in a reduced-pressure atmosphere to give a hydrogen separation alloy ingot having a metallographic structure being biphasically separated into an Nb-enriched phase serving as a hydrogen-permeable phase, and a transition metal phase serving as a hydrogen-embrittlement-resistant phase; a hot working step of performing hot plastic working on the hydrogen separation alloy ingot; and a cold rolling step of performing a cold rolling on the alloy ingot after the hot plastic working. The cold rolling step includes a step of annealing the alloy ingot at least once by heating the alloy ingot to a temperature of 800° C. or higher and lower than 1100° C. A total reduction of the alloy ingot is 99% or more. As used herein the term "temperature of 800° C. or higher and lower than 1100° C." refers to a "temperature which is 800° C. or higher and is lower than 1100° C." and does not include temperatures of lower than 800° C. and temperature of 1100° C. or higher.

The total reduction herein refers to a value represented by the following equation:

$$\text{Total reduction} = \frac{t_i - (t_m + t_0)}{t_i} \times 100$$

In the equation, $t_i$ represents the thickness of the alloy ingot upon casting; $t_m$ represents the thickness of the sheet after final rolling; and $t_o$ represents the thickness of an oxide film removed after hot working.

The method for producing a hydrogen separation alloy preferably further includes the step of annealing by heating the alloy ingot to a temperature of 800° C. or higher and lower than 1100° C. between the hot working step and the cold rolling step.

The method for producing a hydrogen separation alloy employs at least one element selected from the group consisting of Ti, Zr and Hf; at least one element selected from the group consisting of Ni, Co, Cr, Fe, Cu and Zn; and Nb as metal materials.

The present invention will be illustrated in detail with reference to several embodiments and working examples below.

EXAMPLES

FIG. 1 depicts an electron micrograph illustrating a cross section of a hydrogen separation alloy according to an embodiment.

When a cross section in a rolling direction is observed with an electron microscope, the hydrogen separation alloy according to the embodiment has a metallographic structure which is biphasically separated into two phases, i.e., an Nb-enriched white hydrogen-permeable phase and a transition-metal-containing gray hydrogen-embrittlement-resistant phase, for example, as illustrated in the cross sectional electron micrograph of FIG. 1. In the structure, the hydrogen-permeable phase is elongated as a result of plastic working. As used herein the term "transition metal phase" refers to a phase containing two or more transition metal elements belonging to elements of from Group 3 to Group 12 of the periodic table.

In the hydrogen separation alloy according to the embodiment, the hydrogen-permeable phase should occupy 35 to 70 percent by area of the area when the cross section of the alloy in the rolling direction is measured in an arbitrary 10 μm×10 μm square region of a 50 μm×50 μm square view field. This area percentage is an index indicating the uniformity of the metallographic structure of the hydrogen separation alloy according to this embodiment. It may not sufficiently help the hydrogen separation alloy to have both satisfactory hydrogen permeability and good hydrogen-embrittlement resistance if the hydrogen-permeable phase has an excessively small area percentage or has an excessively large area percentage contrarily. A preferred lower limit of the area percentage of the hydrogen-permeable phase is 40% of the area of the view field.

When the metallographic structure is uniform, there is no large difference between measured results even when the measurements are performed at any positions in the view field. Hence, the area of view field in which the area percentage of hydrogen-permeable phase in this embodiment is measured is defined as an arbitrary 10 μm×10 μm square region in a 50 μm×50 μm square observation plane.

Figure 2:
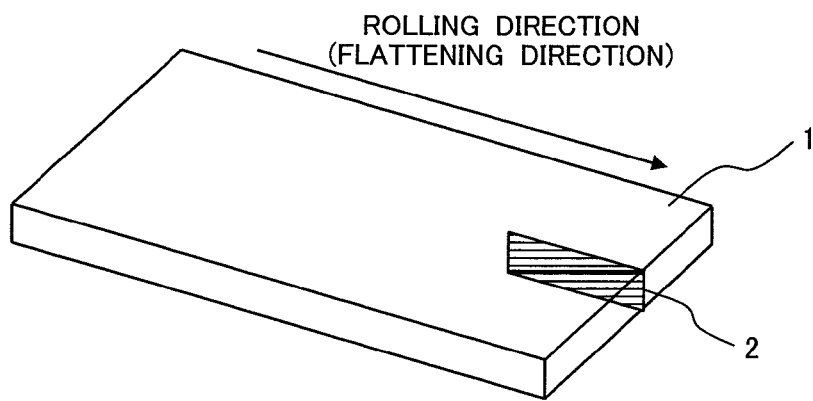
FIG. 2 is a schematic view illustrating an observation plane.

FIG. 2 is a schematic view illustrating an observation plane in which the metallographic structure of the hydrogen separation alloy according to the embodiment is observed.

In FIG. 2, the reference sign 1 stands for the hydrogen separation alloy. FIG. 2 depicts the location (direction) of an observation plane 2 to be observed with an electron microscope.

The hydrogen separation alloy according to the embodiment has a metallographic structure in which elongated hydrogen-permeable phases have narrow spacing between each other, and parts of the phases are connected to each other in the thickness direction. This metallographic structure allows hydrogen to permeate the hydrogen separation alloy along the thickness direction.

In addition, the metallographic structure allows hydrogen to permeate from one surface to the other surface of a rolled material as illustrated in this figure. Accordingly, the hydrogen permeable membrane can have a large area and excels in hydrogen permeability when the hydrogen separation alloy is formed into a hydrogen permeable membrane product.

To form the metallographic structure according to the embodiment, it is desirable to perform rolling so as to extend or flatten the hydrogen-permeable phases and to allow the hydrogen-permeable phases to approach each other. As a result, the hydrogen-permeable phases are elongated along the rolling direction, and this gives a metallographic structure in which the hydrogen-permeable phases each have a thickness of 10 μm or less, and some of the hydrogen-permeable phases are connected to each other in the thickness direction. The hydrogen-permeable phases each have a thickness of preferably 7 μm or less and more preferably 5 μm or less.

The observation plane illustrated in this figure is a cross section in a direction of thickness which has been reduced by rolling and in a direction of rolling and resulting flattening.

The metallographic structure according to the embodiment may be obtained by performing a suitable plastic working and a suitable heat treatment on a hydrogen separation alloy. A production method for this purpose will be described later.

For obtaining the metallographic structure according to the embodiment, it is preferred to design the chemical composition of the alloy so as to fall within the following range.

Specifically, the hydrogen separation alloy preferably has a composition represented by the following compositional formula: $Nb_{100-(\alpha+\beta)}M^1_\alpha M^2_\beta$, where $M^1$ is at least one element selected from the group consisting of Ti, Zr and Hf; $M^2$ is at least one element selected from the group consisting of Ni, Co, Cr, Fe, Cu and Zn; and α and β satisfy the following conditions: $10 \leq \alpha \leq 60$, $10 \leq \beta \leq 50$, and $\alpha+\beta \leq 80$. In addition, the alloy may further include inevitable impurities.

Niobium (Nb) element forms an $Nb-M^1$ phase (hydrogen-permeable phase) with Element $M^1$ so as to ensure hydrogen permeability. Particularly for obtaining high hydrogen permeability, the Nb content is preferably 20 atomic percent or more in terms of $[100-(\alpha+\beta)]$. In other words, the total sum of α and β (α+β) mentioned below is preferably 80 atomic percent or less, and is more preferably from 60 to 70 atomic percent.

Element $M^1$ is selected from the group consisting of Ti, Zr and Hf. As is described above, Element $M^1$ forms the $Nb-M^1$ phase with Nb and thereby contributes to hydrogen permeability.

The alloy may undergo significant hydrogen embrittlement and may fracture immediately after hydrogen permeation, though having high hydrogen permeability, if having the content a of Element $M^1$ of less than 10 atomic percent. In contrast, the alloy may show insufficient hydrogen permeability, if having the content α of Element $M^1$ of more than 60 atomic percent. The content α is preferably from 20 to 40 atomic percent.

Of Elements $M^1$, Ti is most preferably added. This is because the addition of Zr or Hf may tend to harden the hydrogen separation alloy, and this may impede the plastic working. The total content of Zr and/or Hf is preferably about 20% of the total content of Elements $M^1$ with the remainder being Ti when Zr and/or Hf are added.

The $Nb-M^1$ phase may further contain a trace amount, i.e., about 5 atomic percent or less of Element $M^2$, but this causes no problem.

Element $M^2$ is selected from the group consisting of Ni, Co, Cr, Fe, Cu and Zn.

Element $M^2$ is necessary for the formation of a $M^2-M^1$ phase (hydrogen-embrittlement-resistant phase) and for playing a role in hydrogen-embrittlement resistance.

The alloy preferably has a content β of Element $M^2$ of from 10 to 50 atomic percent. The alloy may have inferior mechanical workability, if having a content of Element $M^2$ of less than 10 atomic percent. In contrast, the alloy may become brittle, if having a content β of more than 50 atomic percent. The alloy also in this case may have inferior mechanical workability. The content β is preferably from 25 to 45 atomic percent.

Of Elements $M^2$, Ni is preferably chosen. This is because nickel reacts with titanium (Ti) to form NiTi and thereby facilitates the plastic working. In order to further improve hydrogen permeability and/or hydrogen-embrittlement resistance, any of Co, Cr, Fe, Cu and Zn may be used in combination with Ni within the range of the content β. When any of Co, Cr, Fe, Cu and Zn is added in combination with Ni, the total content of these elements is preferably 75% or less based on the total amount of Elements $M^2$, because nickel reacts with titanium to form NiTi and thereby facilitates the plastic working.

The $M^2-M^1$ phase may contain Nb in a small content of about 10 atomic percent or less, but this produces no problem.

Next, a method for producing a hydrogen separation alloy according to the embodiment will be illustrated.

The production of a hydrogen separation alloy ingot (hereinafter also simply referred to as an "alloy ingot") essentially requires melting in a reduced-pressure atmosphere, such as vacuum melting. This is because the hydrogen separation alloy according to the embodiment contains Nb having high affinity for oxygen, and Ti as a preferred selected element.

When melting is performed in a reduced-pressure atmosphere, it is preferred to give an alloy ingot having an oxygen content of 1000 ppm or less. This is for suppressing the generation of brittle intermetallic compounds which reduce rolling performance.

Next, the alloy ingot (material) of hydrogen separation alloy obtained by melting and casting in the reduced-pressure atmosphere is worked to a total reduction of 99% or more by a hot working step of performing hot plastic working on the material; and a cold rolling step during which annealing by heating the material to a temperature of 800° C. or higher and lower than 1100° C. is performed at least once.

The melting in a reduced-pressure atmosphere may be performed in an inert gas atmosphere such as Ar at a pressure of 5×10⁴ Pa or less so as to avoid contamination of oxygen. Particularly when a vacuum melting is performed, the melting atmosphere is preferably reduced in pressure to 0.1 Pa or less.

The hydrogen separation alloy is generally worked to a thickness of from about 0.01 to about 1 mm, because the hydrogen separation alloy shows improved hydrogen permeability with a decreasing thickness thereof. However, it is difficult to produce such a thin sheet with good precision by hot working alone, and it is necessary to employ hot working in combination with a cold rolling step.

The hot working step is advantageously performed for adjusting the shape of ingot to be suitable as the material for the cold rolling step performed later and for increasing the total reduction so as to flatten the hydrogen-permeable phase. Specific examples of the hot working include hot forging, hot pressing and hot rolling. Each of the hot forging, hot pressing and hot rolling may be performed alone or in combination.

In this embodiment, annealing may be performed on the material after the hot working (namely, between the hot working step and the after-mentioned cold rolling step) by heating the material to a temperature of 800° C. or higher and lower than 1100° C. The annealing is preferably performed at a temperature of 800° C. or higher for softening the hydrogen separation alloy after the plastic working. The annealing may cause the elongated hydrogen-permeable phase to be increasingly coarse, and this may impede the control of the hydrogen-permeable phase to have a uniform metallographic structure even by the subsequent cold working, if the annealing is performed at a temperature of higher than 1100° C.

The annealing is preferably performed typically in a reducing atmosphere such as hydrogen atmosphere, or in an inert gas atmosphere such as nitrogen or argon atmosphere, or in a vacuum atmosphere, so as to prevent embrittlement of the hydrogen separation alloy due typically to oxidation.

In this embodiment, the cold rolling step is performed after the hot working step, so as to allow the hydrogen separation alloy material to be worked to a total reduction of 99% or more and to thereby give a hydrogen separation alloy as a sheet having a thickness of 1 mm or less.

The cold rolling helps the rolled material to have a broader width easily and thereby helps the resulting hydrogen separation alloy to be more easily adopted to a large-sized product having a large surface area of a hydrogen-permeating side. The cold rolling helps the hydrogen-permeable phase to further extend to form a uniformly layered hydrogen-permeable phase. This increases an area of an interface between the hydrogen-permeable phase and the hydrogen-embrittlement-resistant phase and thereby more satisfactorily relaxes the stress generated at the interface between the hydrogen-permeable phase and the hydrogen-embrittlement-resistant phase due to expansion and shrinkage of a crystal lattice with hydrogen absorption/desorption. As a result, not only the hydrogen-embrittlement resistance is improved, but also the elongated hydrogen-permeable phases are very close to each other with the interposition of hydrogen-embrittlement-resistant phases. Hence, a metallographic structure including hydrogen-permeable phases being partly connected to each other in the thickness direction can be more easily obtained, the hydrogen-permeable phases being elongated by the annealing performed in combination with the cold rolling.

The above advantageous effects may not be obtained if the alloy material is worked to a total reduction of less than 99% as a result of the hot working and the cold rolling. According to this embodiment, therefore, the hot working and the cold rolling are essentially performed to a total reduction of 99% or more, and preferably 99.5% or more.

In the cold rolling step, annealing at a temperature of 800° C. or higher and lower than 1100° C. is performed. The annealing is preferably performed in mid-course of the cold rolling step.

The annealing may not sufficiently effectively soften the intermediate material during the cold rolling, and this may impede the cold rolling to achieve a total reduction of 99% or more, if the annealing is performed at a temperature lower than 800° C. In addition, this may impede the production of the hydrogen separation alloy having sufficient hydrogen permeability, because a strain generated by the cold rolling serves as a site for scavenging hydrogen.

Though the metallographic structure including elongated hydrogen-permeable phases connected in the thickness direction is more easily obtained with an elevating annealing temperature, the elongated hydrogen-permeable phases are susceptible to be granular at an annealing temperature of 1100° C. or higher. In this case, the area of the interface between the hydrogen-permeable phase and the hydrogen-embrittlement-resistant phase decreases, and this may impede the relaxation of stress generated between the hydrogen-permeable phase and the hydrogen-embrittlement-resistant phase due to expansion and shrinkage of the crystal lattice with hydrogen absorption/desorption. The resulting hydrogen separation alloy may thereby have insufficient hydrogen-embrittlement resistance.

The annealing is preferably performed typically in a reducing atmosphere such as hydrogen atmosphere, or in an inert gas atmosphere such as nitrogen or argon atmosphere, or in a vacuum atmosphere, so as to prevent embrittlement of the hydrogen separation alloy due typically to oxidation.

As materials, metal Ni in an amount of 25 percent by mass, metal Ti in an amount of 21 percent by mass, with the remainder being metal Nb were mixed and charged into a crucible, and the crucible was placed in a high frequency induction melting furnace (Specifically, the metal materials herein are Ni, Ti and Nb.). The furnace was then evacuated to 5.3×10⁻² Pa using an oil-sealed rotary pump and a molten metal diffusion pump, and Ar was introduced to a pressure of 1.3×10⁴ Pa. The resulting material was melted by heating and held for one hour to give a uniform molten metal.

The molten metal was cast and thereby yielded a rectangular hydrogen separation alloy ingot (hereinafter also simply referred to as an "alloy ingot") 80 mm thick, 80 mm wide, and 140 mm long (melting step).

Table 1 shows the composition of the alloy ingot, in which upper-row figures are indicated by percent by mass, and lower-row figures are indicated by atomic percent. The obtained alloy ingot contains trace amounts of impurities inevitably contaminated upon production, but only the contents of Nb, Ni (Element $M^2$), and Ti (Element $M^1$) are shown in Table 1, because it is difficult to identify all contained elements and to calculate atomic percent thereof.

TABLE 1

| No. | Nb | Upper row (percent by mass); lower row (atomic percent) | | Remarks |
|---|---|---|---|---|
| | | Element $M^2$ | Element $M^1$ | |
| Example 1 | 53.9 | Ni: 25.3 | Ti: 20.8 | Alloy having a chemical composition within the scope of the present invention |
| | 40.2 | Ni: 29.8 | Ti: 30.0 | |
| Example 2 | 57.1 | NI: 23.4 | Ti: 19.5 | Alloy having a chemical composition within the scope of the present invention |
| | 43.3 | Ni: 28.1 | Ti: 28.6 | |

The alloy ingot according to Example 1 was heated to 1000° C. and subjected to hot forging to have a thickness in a short side of 25 mm. When a temperature drop of the alloy was observed, the hot forging was suspended, and the alloy was heated again to 1000° C., followed by the hot forging.

Next, hot rolling (hot plastic working) at a heating temperature of 1000° C. was further performed repeatedly to yield a hot-rolled material 2.5 mm thick, 100 mm wide, and 1200 mm long (hot working step).

The prepared hot-rolled material was cut to a length of 500 mm, from which an oxide layer was removed, and the pressure was reduced to $1.3 \times 10^{-3}$ Pa, followed by a vacuum annealing at 900° C. for one hour.

The hot-rolled material after the annealing was subjected to a cold rolling so as to give a sheet having a thickness of 0.1 mm. As a work hardening impeded the rolling in mid-course of the cold rolling, vacuum annealing at 900° C. for one hour was temporarily performed, followed by cold rolling again (cold rolling step).

Finally, the cold-rolled material was subjected to a stress relief annealing at 900° C. for 27 hours. The hot forging, hot rolling and cold rolling were performed to a total reduction of 99.57%.

The sheet-like hydrogen separation alloy after the cold rolling had a thickness of 0.1 mm, a width of 120 mm, and a length of 5200 mm and had a sufficient surface area.

A disc-like specimen having a diameter of 20 mm was punched from the prepared 0.1-mm thick hydrogen separation alloy after the cold rolling, and Pd was deposited to a thickness of about 100 nm through radio frequency magnetron sputtering on the surface of the specimen, and thereby yielded a hydrogen separation membrane using the hydrogen separation alloy according to the example.

Next, hydrogen separation membranes as Examples 3 and 4 were produced by the production method of Example 1, except for changing the compositional ratio among Nb, Ni and Ti. The alloy compositions according to Examples 3 and 4 are shown in Table 2 in the same manner as in Example 1.

TABLE 2

| No. | Nb | Element $M^2$ | Element $M^1$ | Remarks (Atomic percent) |
|---|---|---|---|---|
| Example 3 | 44.1 | Ni: 26.1 | Ti: 29.8 | Alloy having a chemical composition within the scope of the present invention |
| Example 4 | 30.4 | Ni: 34.7 | Ti: 34.9 | Alloy having a chemical composition within the scope of the present invention |

Hydrogen separation alloys according to comparative examples were prepared in the following manner.

Specifically, hydrogen separation membranes according to the comparative examples were prepared by cutting sheet materials having thicknesses of 1 mm (Comparative Example 1), 2 mm (Comparative Example 2), and 3 mm (Comparative Example 3) from the alloy ingot according to Example 2 shown in Table 1 using an electrical discharge machine.

The sheet materials were subjected to a cold rolling to give sheets each having a thickness of 0.5 mm. In mid-course of the cold rolling, a vacuum annealing at 900° C. for one hour was performed. The hydrogen separation alloys after the cold rolling were further subjected to a vacuum annealing at 1100° C. for 48 hours.

The prepared hydrogen separation alloys were cut to discs each having a diameter of 20 mm and were mechanically polished to a thickness of 0.3 mm through buffing with an abrasive paper and aluminum abrasive grains.

Finally, Pd was deposited to a thickness of about 100 nm on the surfaces of the samples by radio frequency magnetron sputtering and thereby yielded hydrogen separation membranes.

Next, the metallographic structures of the hydrogen separation alloy according to the example and of the hydrogen separation alloys according to the comparative examples were observed. The observation plane herein is as illustrated in FIG. 2.

FIG. 1 depicts the structure of the alloy according to Example 1.

Phases appearing white are Nb-enriched hydrogen-permeable phases (Nb-$M^1$ phases where $M^1$ is Ti), whereas phases appearing gray are hydrogen-embrittlement-resistant phases as transition metal phases ($M^2$-$M^1$ phases where $M^2$ is Ni; and $M^1$ is Ti).

In the observation plane, there are two types of phases visually identified, i.e., the hydrogen-permeable phase and the hydrogen-embrittlement-resistant phase. Specifically, this alloy is a hydrogen separation alloy in which the hydrogen-permeable phase and the hydrogen-embrittlement-resistant phase are elongated by the plastic working, and some of layers of the elongated hydrogen-permeable phase are connected to each other in the thickness direction.

The hydrogen separation alloy according to the example has a very high total reduction of 99.57% and thereby has a metallographic structure including thin hydrogen-permeable phases highly uniformly dispersed.

Table 3 shows area percentages of hydrogen-permeable phases of the (sheet-like) hydrogen separation alloy according to the example, in which the area percentages were determined by taking a photograph of a cross section of the hydrogen separation alloy in the rolling direction with an electron microscope, selecting three 10 μm×10 μm square regions in a 50 μm×50 μm square view field of the photograph, and measuring the area percentages of the hydrogen-permeable phases in the three regions.

Table 3 demonstrates that area percentages of the hydrogen-permeable phases in all the regions ranges from 37.5% to 60.5% though each of the regions has a small area of 100 μm. The result indicates that the hydrogen separation alloy according to the example has a highly uniform metallographic structure.

TABLE 3

| | Area percentage of hydrogen-permeable phase (%) | | |
|---|---|---|---|
| | Example 1 | Example 3 | Example 4 |
| Region 1 | 55.3 | 54.2 | 43.3 |
| Region 2 | 60.5 | 52.5 | 38.4 |
| Region 3 | 57.1 | 42.7 | 37.5 |

Figure 3:
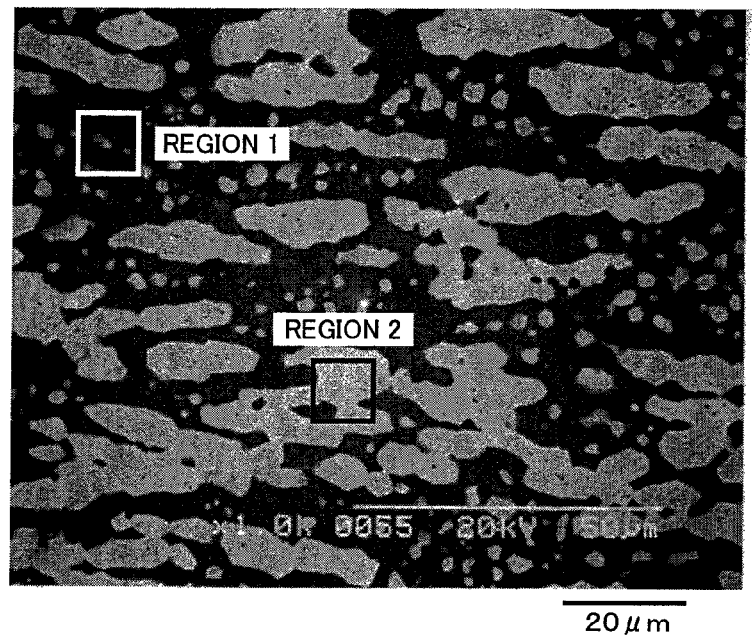
FIG. 3 is an electron micrograph illustrating a cross section of a hydrogen separation alloy according to Comparative Example 1.
Figure 4:
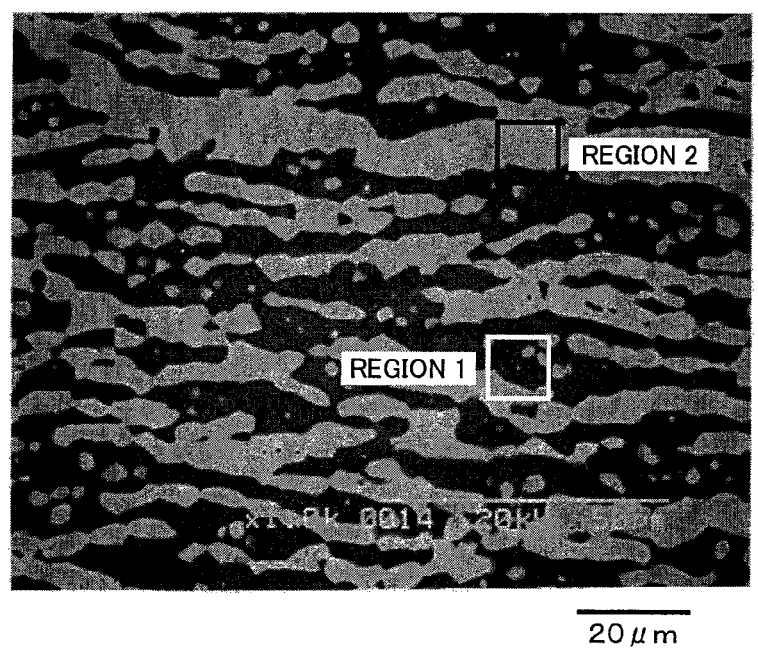
FIG. 4 is an electron micrograph illustrating a cross section of a hydrogen separation alloy according to Comparative Example 2.
Figure 5:
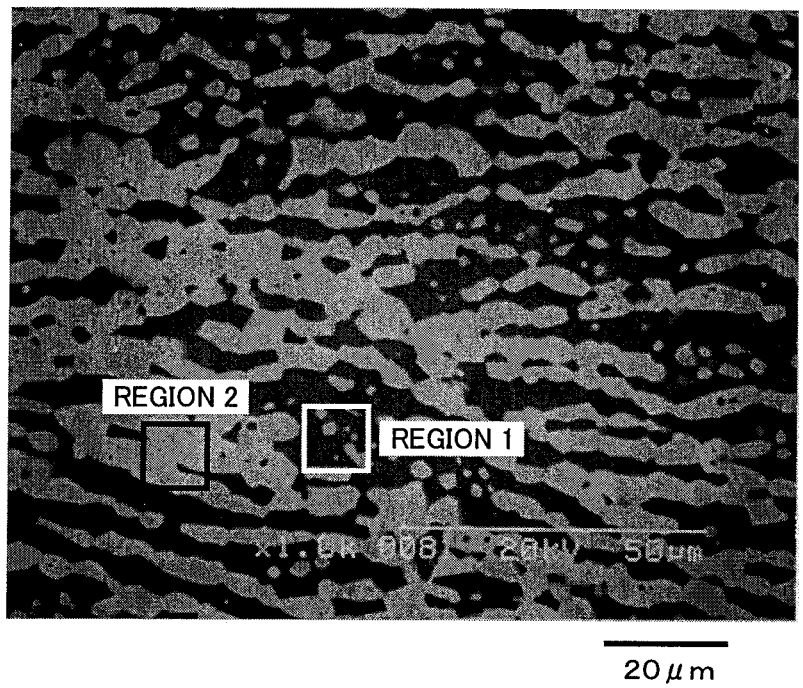
FIG. 5 is an electron micrograph illustrating a cross section of a hydrogen separation alloy according to Comparative Example 3.

FIGS. 3 to 5 depict the structures of the alloys according to Comparative Examples 1 to 3, respectively.

These alloy structures are found to include very coarse hydrogen-permeable phases, when compared to that of the hydrogen separation alloy according to the example. As illustrated in the figures, the area percentage of the hydrogen-permeable phases ranges approximately from 10% to 90% in the same alloy and varies from a region to another in all the alloys according to Comparative Examples 1 to 3 when 10 μm×10 μm square regions are arbitrarily selected.

This is because the hydrogen separation alloys according to Comparative Examples 1, 2 and 3 have been worked to low total reductions of 50%, 75% and 85%, respectively, and thereby fail to render the hydrogen-permeable phases to be sufficiently thin and to have a uniformly layered structure. If coarse hydrogen-permeable phases are present nonuniformly as above, the hydrogen separation alloy suffers from locally significantly large stress generated at the interface between the hydrogen-permeable phase and the hydrogen-embrittlement-resistant phase and thereby has an insufficient hydrogen-embrittlement resistance upon absorption of hydrogen.

Table 4 shows the measured results of the area percentages.

TABLE 4

| | Area percentage of hydrogen-permeable phase (%) | | |
|---|---|---|---|
| | Comparative Example 1 | Comparative Example 2 | Comparative Example 3 |
| Region 1 | 7.1 | 28.4 | 19.5 |
| Region 2 | 85.4 | 76.6 | 92.6 |

Next, the prepared hydrogen separation membranes were subjected to hydrogen permeation tests to assess hydrogen permeability and hydrogen-embrittlement resistance.

Specifically, each of the hydrogen separation membranes was sandwiched between stainless steel gaskets, placed in a sample holder, and hermetically sealed so as to avoid gas leakage. After evacuating the both sides of the sample hydrogen separation membrane to produce a vacuum, the hydrogen separation metal membrane was heated to 350° C. and held at the temperature.

Next, hydrogen was introduced into the both sides of the hydrogen separation membrane each to a pressure of 0.1 MPa. While the hydrogen pressure of one side of the membrane was increased step-by-step to 0.9 MPa, the flow rate of hydrogen permeated the hydrogen separation membrane was measured with a mass flow meter. When membrane fracture occurred during the test, the test was discontinued at that pressure.

Measurements were performed on eight specimens per each production condition to determine a hydrogen permeability coefficient and an average of hydrogen pressure differences applied on the hydrogen separation membrane at the time when membrane fracture occurred.

Table 5 shows the results.

TABLE 5

| | Reduction of area (%) | Membrane thickness (mm) | Average hydrogen pressure difference upon membrane fracture (MPa) | Hydrogen permeability coefficient (mol-$H_2 \cdot m^{-1} \cdot s^{-1} \cdot Pa^{-0.5}$) |
|---|---|---|---|---|
| Example 1 | 99.57 | 0.1 | 0.6 | $1.92 \times 10^{-8}$ |
| Example 3 | 99.6 | 0.1 | no fracture | $1.22 \times 10^{-8}$ |
| Example 4 | 99.5 | 0.1 | no fracture | $0.59 \times 10^{-8}$ |
| Comparative Example 1 | 50 | 0.5 | 0.45 | $0.99 \times 10^{-8}$ |
| Comparative Example 2 | 75 | 0.5 | 0.5 | $1.21 \times 10^{-8}$ |
| Comparative Example 3 | 85 | 0.5 | 0.35 | $1.55 \times 10^{-8}$ |

As is demonstrated in Table 5, the hydrogen separation membranes using the hydrogen separation alloys according to the examples had both a high hydrogen-embrittlement resistance and a high hydrogen permeability coefficient.

In contrast, the hydrogen separation membranes using hydrogen separation alloys according to Comparative Examples 1 to 3 were more susceptible to the membrane fracture as compared to the hydrogen separation membrane using the hydrogen separation alloy according to Example 1, even though having the same alloy composition as with Example 1 and having larger membrane thicknesses. This is because the hydrogen separation alloys according to the comparative examples have insufficient total reductions; and because the heat treatment after the final rolling was performed at a high temperature of 1100° C., thereby hydrogen-permeable phases in the alloys were liable to aggregate to reduce the area of the interface between the hydrogen-permeable phase and the hydrogen-embrittlement-resistant phase, and a very large stress is generated at the interface between the hydrogen-permeable phase and the hydrogen-embrittlement-resistant phase upon the hydrogen absorption/desorption as a result.

The hydrogen separation membranes according to Comparative Examples 1 to 3 had lower hydrogen permeability coefficients than that of the hydrogen separation membrane according to Example 1, as including hydrogen-permeable phases not being connected to each other in the thickness direction due to insufficient total reductions.

As has been described above, the hydrogen separation alloys according to the examples can inexpensively give hydrogen separation metal membranes each having a large surface area while achieving both satisfactory hydrogen permeability and excellent hydrogen-embrittlement resistance, both of which are fundamental properties required of such hydrogen separation alloys. This is achieved by optimizing established working processes such as hot working and cold working, namely by controlling the metallographic structures of the alloys. The hydrogen separation alloys can therefore be expected to be adopted to large-sized products such as industrial hydrogen purifiers and membrane reactors.

the present invention allows an alloy to improve hydrogen-embrittlement resistance by relaxing stress caused by expansion and shrinkage of the crystal lattice with the hydrogen absorption/desorption and to improve hydrogen permeability, and thereby to have a fine layered structure of elongated hydrogen-permeable phases and to include the elongated hydrogen-permeable phases uniformly dispersed therein by using a plastic working and a heat treatment as simple production processes for alloy membranes.

As a result, the present invention enables inexpensive production of the hydrogen separation alloy which excels both in the hydrogen permeability and in the hydrogen-embrittlement resistance and which is adaptable even to the large-sized product having the large surface area of the hydrogen-permeating surface.

Reference Signs List
1: hydrogen separation alloy
2: observation plane

The invention claimed is:

1. A hydrogen separation alloy being represented by a compositional formula: $Nb_{100-(\alpha+\beta)} M^1_\alpha M^2_\beta$,
wherein $M^1$ is at least one element selected from the group consisting of Ti, Zr and Hf,
$M^2$ is at least one element selected from the group consisting of Ni, Co, Cr, Fe, Cu and Zn,
$\alpha$ and $\beta$ satisfy following conditions: $10 \leq \alpha \leq 60$, $10 \leq \beta \leq 50$, and $\alpha+\beta \leq 80$, and
containing inevitable impurities; and
having a metallographic structure being biphasically separated into an Nb-enriched phase serving as a hydrogen-permeable phases; and a transition metal phase serving as a hydrogen-embrittlement-resistant phases, wherein the hydrogen-permeable phases and the hydrogen-embrittlement-resistant phases each are to have an elongated structure when a cold rolling is performed on the hydrogen separation alloy, and the hydrogen-permeable phase occupying 35% to 70% of an arbitrary 10 μm×10 μm square region in a 50 μm×50 μm square observation plane of a cross section of the alloy under observation with an electron microscope, the cross section being taken in a direction of the thickness of the alloy and in a direction of the length of the alloy, wherein the hydrogen-permeable phase is an Nb-$M^1$ phase, wherein the hydrogen-embrittlement-resistant phase is a $M^2$-$M^1$ phase, and wherein at least a portion of the hydrogen-permeable phase are connected in the thickness direction.

2. The hydrogen separation alloy according to claim 1, wherein $M^1$ is Ti; and $M^2$ is Ni.

3. The hydrogen separation alloy according to claim 1, being in a form of a sheet having a thickness of 1 mm or less.

4. A method for producing a hydrogen separation alloy being represented by a compositional formula: $Nb_{100-(\alpha+\beta)}M^1{}_\alpha M^2{}_\beta$ (where $M^1$ is at least one element selected from the group consisting of Ti, Zr and Hf; $M^2$ is at least one element selected from the group consisting of Ni, Co, Cr, Fe, Cu and Zn; and α and β satisfy following conditions: 10≤α≤60, 10≤β≤50, and α+β≤80), wherein the hydrogen separation alloy includes inevitable impurities, the method comprising:
a melting step of melting and casting materials in a reduced-pressure atmosphere to give a hydrogen separation alloy ingot having a metallographic structure being biphasically separated into an Nb-enriched phase serving as a hydrogen-permeable phase which is an Nb-$M^1$ phase, and a transition metal phase serving as a hydrogen-embrittlement-resistant phase which is a $M^2$-$M^1$ phase;

a hot working step of performing a hot plastic working on the hydrogen separation alloy ingot; and a cold rolling step of performing cold rolling on the alloy ingot after the hot plastic working, wherein the cold rolling step includes a step of annealing the alloy ingot at least once by heating the alloy ingot to a temperature of 800° C. or higher and lower than 1100° C., and wherein a total reduction of the alloy ingot is 99% or more and at least a portion of the hydrogen-permeable phase are connected in the thickness direction.

5. The method for producing the hydrogen separation alloy according to claim 4, further comprising a step of annealing between the hot working step and the cold rolling step, the step of the annealing being performed by heating the alloy ingot to a temperature of 800° C. or higher and lower than 1100° C.

6. The method for producing the hydrogen separation alloy according to claim 4, wherein $M^1$ is Ti, and $M^2$ is Ni.

7. The method for producing the hydrogen separation alloy according to claim 4, wherein the cold rolling step is performed to form the hydrogen separation alloy as a sheet having a thickness of 1 mm or less.

8. A rolled product formed of a hydrogen separation alloy being represented by a compositional formula: $Nb_{100-(\alpha+\beta)}M^1{}_\alpha M^2{}_\beta$, where $M^1$ is at least one element selected from the group consisting of Ti, Zr and Hf, $M^2$ is at least one element selected from the group consisting of Ni, Co, Cr, Fe, Cu and Zn, α and β satisfy following conditions: 10≤α≤60, 10≤β≤50, and α+β≤80, and containing inevitable impurities; and having a metallographic structure being biphasically separated into an Nb-enriched phase serving as a hydrogen-permeable phases; and a transition metal phase serving as a hydrogen-embrittlement-resistant phases, wherein the hydrogen-permeable phases and the hydrogen-embrittlement-resistant phases each are to have an elongated structure when a cold rolling is performed on the hydrogen separation alloy, and the hydrogen-permeable phase occupying 35% to 70% of an arbitrary 10 μm ×10 μm square region in a 50 μm ×50 μm square observation plane of a cross section of the alloy under observation with an electron microscope, the cross section being taken in a direction of the thickness of the alloy and in a direction of the length of the alloy, wherein the hydrogen-embrittlement-resistant phase is a $M^2$-$M^1$ phase, and wherein at least a portion of the hydrogen-permeable phase are connected in the thickness direction.

9. The rolled product formed of a hydrogen separation alloy according to claim 8, wherein $M^1$ is Ti; and $M^2$ is Ni.

10. The rolled product formed of a hydrogen separation alloy according to claim 8, being in a form of a sheet having a thickness of 1 mm or less.

11. The rolled product formed of a hydrogen separation alloy according to claim 8, wherein at least a portion of the hydrogen-permeable phases are connected in the thickness direction.

* * * * *